(12) United States Patent
Horng et al.

(10) Patent No.: US 6,465,921 B1
(45) Date of Patent: Oct. 15, 2002

(54) ASSEMBLING STRUCTURE OF A MINIATURE VIBRATION MOTOR

(75) Inventors: Alex Horng, Kaosiung (TW); Ching-shen Hong, Kaohsiung (TW); tso-kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/852,044

(22) Filed: May 10, 2001

(51) Int. Cl.[7] .............................. H02K 7/75; H02K 7/065
(52) U.S. Cl. ...................... 310/81; 310/67 R; 310/89; 310/71
(58) Field of Search ................... 310/81, 67 R, 310/257, 89; H02K 7/075, 7/076

(56) References Cited

U.S. PATENT DOCUMENTS 6,246,140 B1 * 6/2001 Horn ........................ 310/91
6,365,995 B1 * 4/2002 Dukuda ..................... 310/81
6,400,053 B1 * 6/2002 Horn ........................ 310/91

* cited by examiner

Primary Examiner—Karl Tamai
Assistant Examiner—Iraj A Mohandesi
(74) Attorney, Agent, or Firm—Bacon & Thomas, PLLC

(57) ABSTRACT

A assembling structure of a miniature vibration motor includes a seat plate provided with electronic elements, a sensor, and connecting points. A conducting line is provided between the sensor and the connecting points. The seat plate is formed with a shaft hole for fixing of a pivot shaft that passes through the shaft hole of the housing and the shaft hole of the rotor. The rotor has a permanent magnet induced with the poles of the stator seat. The stator seat is wound with a coil, and has connecting legs connected to the connecting points of the seat plate. The housing may be fixed on the seat plate.

9 Claims, 3 Drawing Sheets

ASSEMBLING STRUCTURE OF A MINIATURE VIBRATION MOTOR

BACKGROUND OF THE INVENTION

1. Field of the Invention

The present invention relates to an assembling structure of a miniature vibration motor, and more particularly to an assembling structure of a miniature vibration motor required with a smaller volume, which is easily fixed and assembled.

2. Description of the Related Art

A conventional miniature vibration motor in accordance with the prior art shown in FIG. 1 comprises a motor 90 fixed on the seat 92 of a circuit board 91, and then connected externally by a conducting wire 94 to a control member 95 having a drive circuit.

The conventional miniature vibration motor is usually available in the communication equipment, such as a calling machine, a mobile telephone (or cellular phone) or the like. The communication equipment is required strictly to have a light and thin design. However, the volume of such a kind of conventional miniature vibration motor is increased due to arrangement of the seat 92. In addition, the motor 90 needs to be connected externally to the drive circuit through the conducting wire 94, thereby complicating the structure, and thereby causing inconvenience.

SUMMARY OF THE INVENTION

The primary objective of the present invention is to provide an assembling structure of a miniature vibration motor, wherein the miniature vibration motor has a simpler structure with a smaller volume, and is easily assembled and fixed.

In accordance with the present invention, there is provided an assembling structure of a miniature vibration motor including a seat plate which is provided with electronic elements, a sensor, and connecting points. A conducting line is provided between the sensor and the connecting points. The seat plate is formed with a shaft hole for fixing of a pivot shaft that passes through the shaft hole of the housing and the shaft hole of the rotor. The rotor has a permanent magnet induced with the poles of the stator seat. The stator seat is wound with a coil, and has connecting legs connected to the connecting points of the seat plate. The housing may be fixed on the seat plate.

Further benefits and advantages of the present invention will become apparent after a careful reading of the detailed description with appropriate reference to the accompanying drawings.

DETAILED DESCRIPTION OF THE PREFERRED EMBODIMENTS

Figure 1:
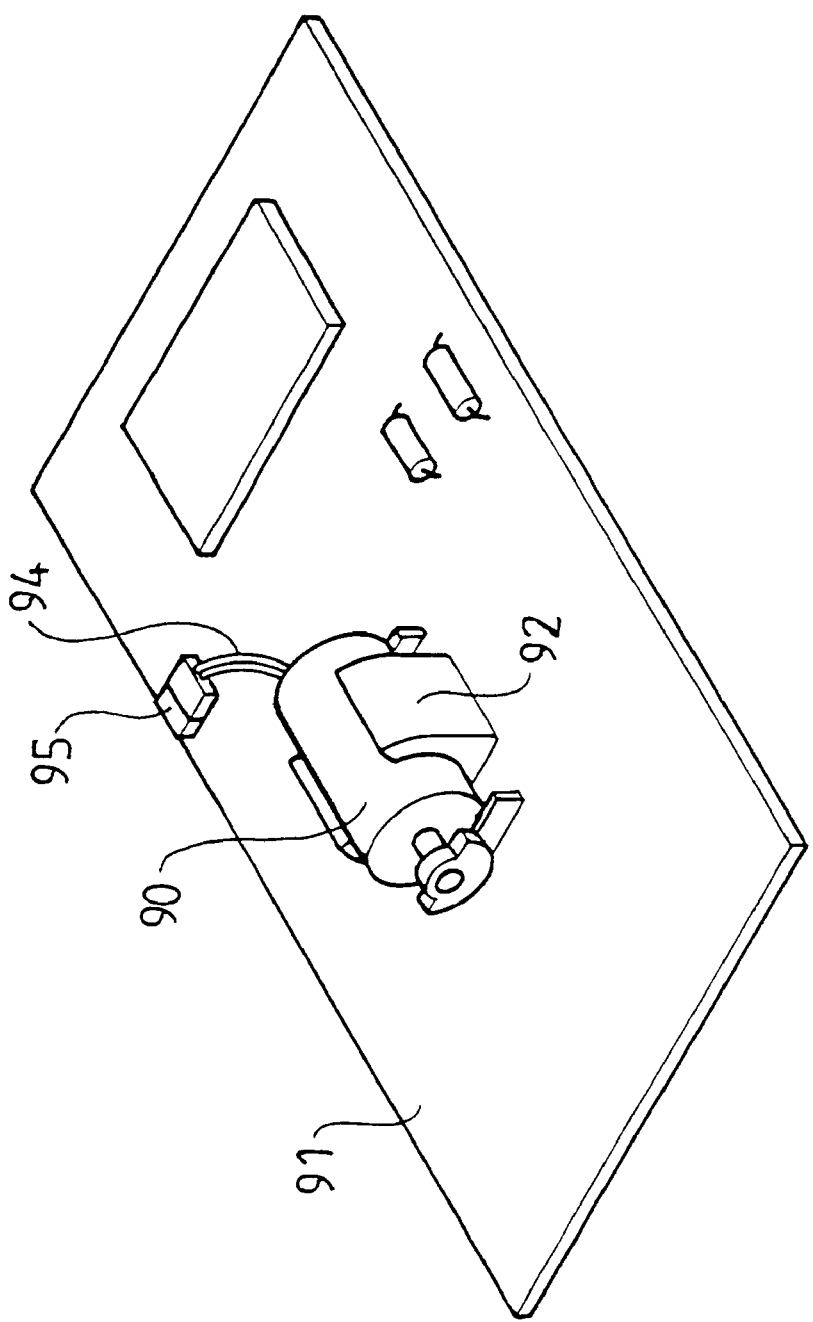
FIG. 1 is a perspective view of a conventional miniature vibration motor in accordance with the prior art.
Figure 2:
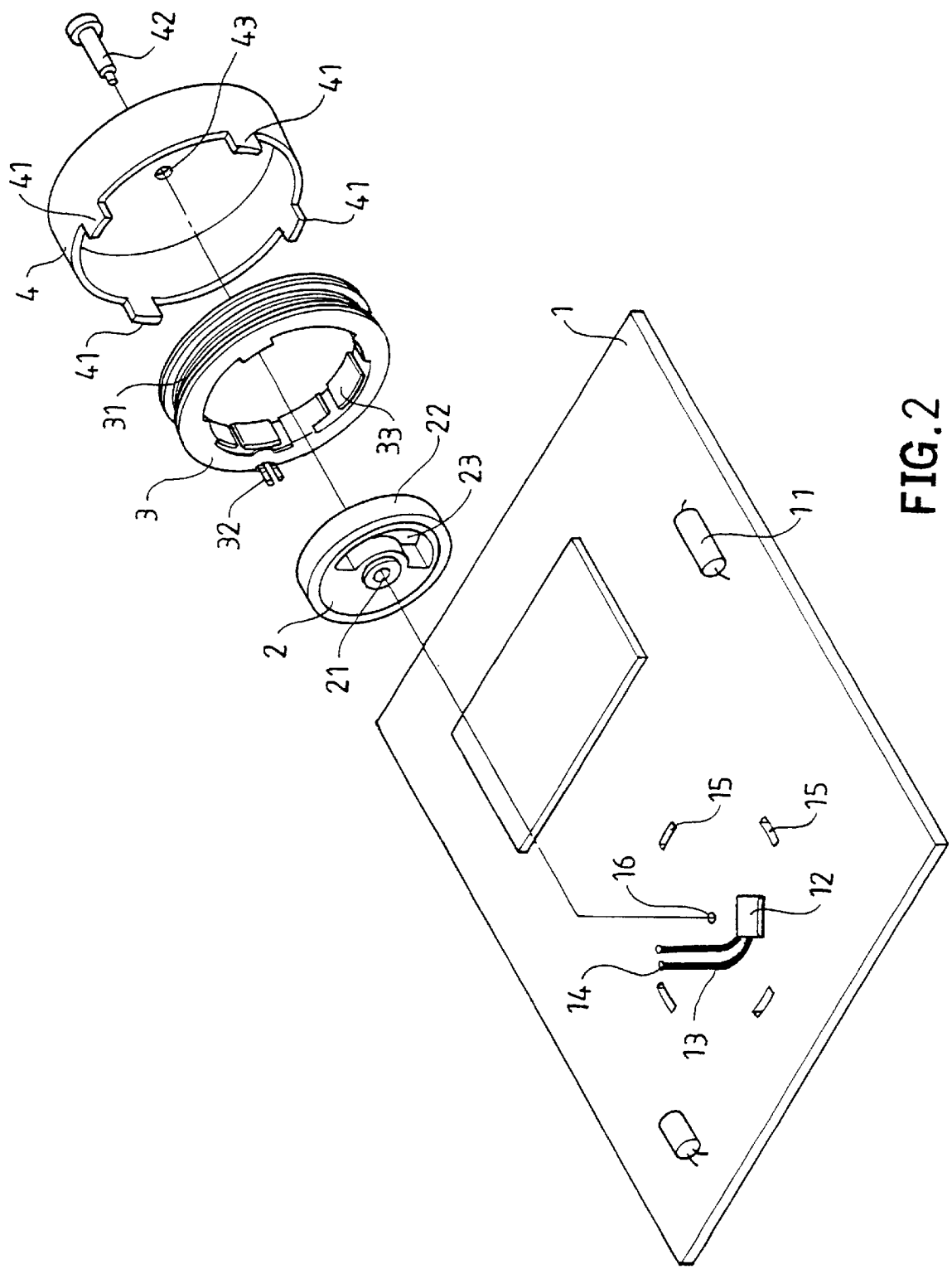
FIG. 2 is an exploded perspective view of an assembling structure of a miniature vibration motor in accordance with the present invention.

Referring to FIG. 2, in accordance with a preferred embodiment of the present invention, the miniature vibration motor includes a seat plate 1, a rotor 2, a stator seat 3, and a housing 4.

The seat plate 1 may be a base plate of a traditional communication equipment. The seat plate 1 has necessary electronic elements 11 (including a drive circuit for driving the motor to rotate), a sensor 12, a conducting line 13, and two connecting points 14 for connection of connecting legs 32 of the stator seat 3, wherein the connecting point 14 may be formed with a through hole for direct inserting connection of the connecting legs 32 of the stator seat 3. The conducting line 13 may be formed by printing. The seat plate 1 is formed with a shaft hole 16 for fixing the pivot shaft 42.

The rotor 2 is formed with a shaft hole 21 so that the pivot shaft 42 is pivoted in the shaft hole 16 of the seat plate 1 to rotate therein. The rotor 2 has a permanent magnet 22 that may be induced with the poles 33 of the stator seat 3, so that the rotor 2 can be driven to rotate. The center of gravity and the center of rotation of the rotor 2 are not located at the same central line. Thus, the rotor 2 may form an unbalanced eccentric state during rotation. In the preferred embodiment, the rotor 2 may be formed with a slot 23, so that the rotor 2 may produce a vibration state during rotation.

The stator seat 3 is wound with a coil 31, and the connecting legs 32 are connected to the connecting points 14 of the seat plate 1 for connection to the power supply. The stator seat 3 has poles 33. The pole 33 may change its polarity by the signal emitted from the sensor 11, and is induced with the permanent magnet 22 of the rotor 2, so that the rotor 2 is driven to rotate.

The housing 4 is formed with a shaft hole 43 for passage of the pivot shaft 42 which then passes through the shaft hole 21 of the rotor 2, and is positioned in the shaft hole 16 of the seat plate 1. The housing 4 receives the stator seat 3 therein, such that the stator seat 3 is covered and protected. The housing 4 may be fixed on the seat plate 1. As shown in the figure, the housing 4 has locking legs 41 that may be inserted and locked in the positioning holes 15 of the seat plate 1, so that the housing 4 may be fixed on the seat plate 1. In addition, the locking leg 41 may be bent as shown in FIG. 3, so that the housing has a better positioning effect.

Figure 3:
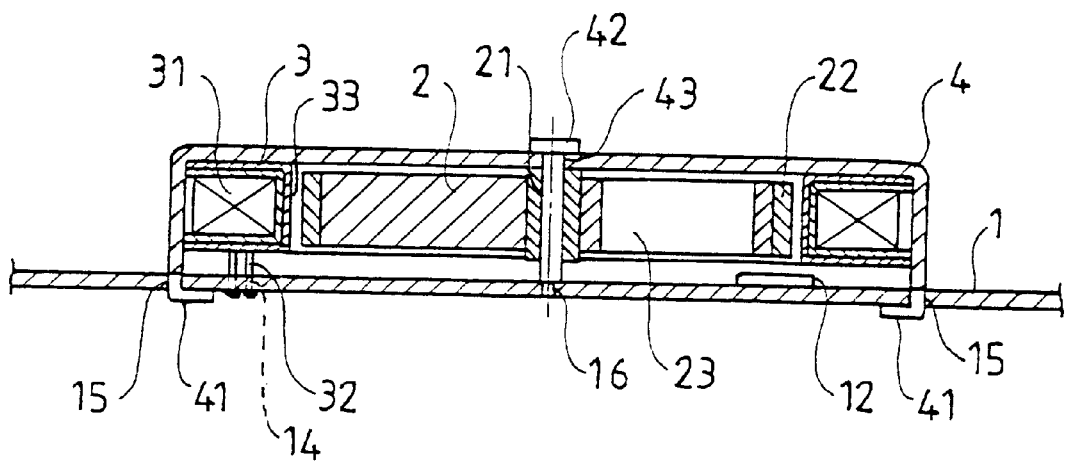
FIG. 3 is a cross-sectional assembly view of the assembling structure of a miniature vibration motor as shown in FIG. 2.

As shown in FIG. 3, the assembled situation of the present invention is illustrated. The connecting leg 32 of the stator seat 3 is directly inserted in the hole formed by the connecting point 14 of the seat plate 1 for connection to the power supply. The pivot shaft 42 passes through the housing 4, the rotor 2, and is fixed in the shaft hole 16 of the seat plate 1. The locking leg 41 of the housing 4 is inserted into the positioning hole 15 of the seat plate 1, or the locking leg 41 is then bent, so that the housing 4 and the entire motor is fixed in position. Thus, when the stator seat 3 is energized, the permanent magnet 22 of the rotor 2 is induced with the poles 33 of the stator seat 3, so that the rotor 2 can be driven to rotate.

Figure 4:
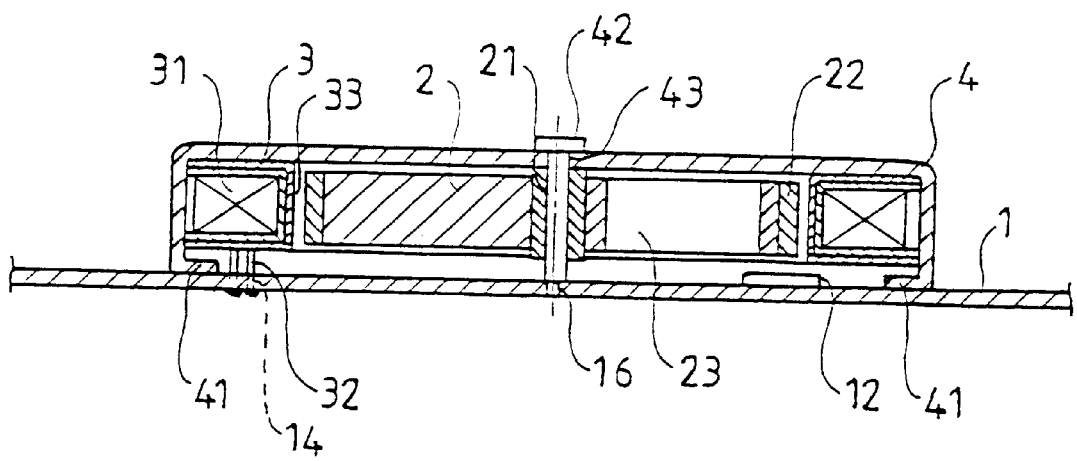
FIG. 4 is a cross-sectional assembly view of the housing and the seat plate of the assembling structure of a miniature vibration motor in accordance with the present invention.

As shown in FIG. 4, another assembling situation of the housing 4 and the seat plate 1 is shown. The locking leg 41 of the housing 4 may be bent directly, and may be soldered or adhered, so that the housing 4 is fixed on the seat plate 1.

Accordingly, in the assembling structure of the miniature vibration motor of the present invention, the connecting points of the seat plate allow the direct connection of the connecting leg of the stator seat, and the conducting line between the connecting point and the sensor may be formed by printing, so that there is no problem of the connecting line between the connecting point and the sensor, thereby preventing wear due to a pulling action. In addition, the volume of the miniature vibration motor also may be shortened, and the positioning and assembling process of the entire motor is also very convenient. Especially, the integral volume and weight of the vibration motor may also be reduced and decreased largely. Therefore, the vibration motor of the present invention may further satisfy the light, thin and small requirements of the communication equipment, and may be easily assembled and fixed.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A assembling structure of a miniature vibration motor, comprising
    a seat plate, having electronic elements, a sensor, and connecting points, a conducting line provided between the sensor and the connecting points;
    a rotor, having a permanent magnet;
    a stator seat, wound with a coil, and having connecting legs connected to the connecting points of the seat plate, the stator seat having poles induced with the permanent magnet of the rotor; and
    a housing, receiving the stator seat and the rotor therein, the housing formed with a shaft hole for passage of a pivot shaft, the housing having locking legs combined and fixed on the seat plate.

2. The assembling structure of a miniature vibration motor as claimed in claim 1, wherein the conducting line of the seat plate is printed on the seat plate in a printing manner.

3. The assembling structure of a miniature vibration motor as claimed in claim 1, wherein the rotor is formed with a slot, such that the center of gravity and the center of rotation of the rotor are not in concert with each other.

4. The assembling structure of a miniature vibration motor as claimed in claim 1, wherein the seat plate is formed with a shaft hole for fixing of the pivot shaft that passes through the housing and the rotor.

5. The assembling structure of a miniature vibration motor as claimed in claim 1, wherein the housing is provided with locking legs, the seat plate is formed with positioning holes, and the locking legs are locked in the positioning holes of the seat plate.

6. The assembling structure of a miniature vibration motor as claimed in claim 5, wherein the locking legs are bent after the locking legs are locked in the positioning holes of the seat plate.

7. The assembling structure of a miniature vibration motor as claimed in claim 1, wherein the housing is provided with locking legs which are soldered or adhered to be fixed on the seat plate.

8. The assembling structure of a miniature vibration motor as claimed in claim 1, wherein the seat plate is formed with connecting holes for insertion of the connecting legs of the stator seat.

9. The assembling structure of a miniature vibration motor as claimed in claim 1, wherein the rotor is formed with a shaft hole for pivot of the pivot shaft.

\* \* \* \* \*